United States Patent
Hess

(10) Patent No.: US 9,746,115 B2
(45) Date of Patent: Aug. 29, 2017

(54) PLUG-IN CONNECTION SYSTEM, IN PARTICULAR FOR FLUIDIC LINES, FITTINGS OR ASSEMBLIES

(71) Applicant: VOSS Automotive GmbH, Wipperfürth (DE)

(72) Inventor: Jochem-Andreas Hess, Wipperfürth (DE)

(73) Assignee: VOSS Automotive GmbH, Wipperfürth (DE)

( * ) Notice: Subject to any disclaimer, the term of this patent is extended or adjusted under 35 U.S.C. 154(b) by 260 days.

(21) Appl. No.: 14/385,366

(22) PCT Filed: Feb. 4, 2013

(86) PCT No.: PCT/EP2013/052158
§ 371 (c)(1),
(2) Date: Sep. 15, 2014

(87) PCT Pub. No.: WO2013/135433
PCT Pub. Date: Sep. 19, 2013

(65) Prior Publication Data
US 2015/0076812 A1    Mar. 19, 2015

(30) Foreign Application Priority Data
Mar. 15, 2012  (DE) .................. 10 2012 102 191

(51) Int. Cl.
*F16L 39/00*  (2006.01)
*F16L 37/088*  (2006.01)
*F16L 37/098*  (2006.01)

(52) U.S. Cl.
CPC .......... *F16L 37/088* (2013.01); *F16L 37/0985* (2013.01)

(58) Field of Classification Search
USPC .................. 285/305, 242, 921, 314, 319
See application file for complete search history.

(56) References Cited

U.S. PATENT DOCUMENTS 2,805,089 A    9/1957  Hansen
3,672,631 A *  6/1972  Grise ............... F16L 37/23
                                                  137/541

(Continued)

FOREIGN PATENT DOCUMENTS

DE    39 24 173 A1    1/1991
JP    S58128596 A     8/1983

(Continued)

OTHER PUBLICATIONS

European Patent Office, International Search Report of International Application No. PCT/EP2013/052158, Mailed on Jun. 3, 2013, 2 pages.

(Continued)

*Primary Examiner* — Aaron Dunwoody
(74) *Attorney, Agent, or Firm* — Eric J. Sosenko; Jonathan P. O'Brien; Honigman Miller Schwartz and Cohn LLP

(57) ABSTRACT

A plug-in connection system for fluidic lines, fittings or assemblies, having a housing part and a plug part that can be plugged into a receiving opening of the housing part. A holding element on one of the coupling parts latches with a mating holding element on the other of the coupling parts. The holding element has a spreading surface that, by sliding relative to a corresponding surface of the plug part causes a spreading movement of the holding element, transversely with respect to an axis during installation. In order to improve the plug-in behavior during installation, a spreading contour of the spreading surface engages a mating contour in such a way that, while being plugged in, the spreading travel (Sw) of the holding element changes in a non-linear manner, depending on the status of installation.

19 Claims, 5 Drawing Sheets

(56) References Cited

U.S. PATENT DOCUMENTS

| | | | | |
|---|---|---|---|---|
| 4,214,779 | A * | 7/1980 | Losell | A61M 39/04 285/319 |
| 4,547,003 | A | 10/1985 | McGugan | |
| 4,708,375 | A * | 11/1987 | Sauer | F16L 33/213 285/258 |
| 4,775,173 | A * | 10/1988 | Sauer | F16L 33/221 285/148.14 |
| 4,929,002 | A * | 5/1990 | Sauer | F16L 33/213 285/148.13 |
| 4,991,882 | A * | 2/1991 | Gahwiler | F16L 37/084 285/319 |
| 5,005,878 | A * | 4/1991 | Smith | F02M 55/004 285/319 |
| 5,267,757 | A * | 12/1993 | Dal Palu | F01P 11/04 285/148.21 |
| 5,356,181 | A | 10/1994 | Shirogane et al. | |
| 5,540,463 | A * | 7/1996 | Potokar | F16L 37/1225 285/319 |
| 5,762,382 | A * | 6/1998 | Pernetti | F16L 37/02 285/239 |
| 6,308,995 | B1 * | 10/2001 | Simson | F16J 13/10 285/305 |
| 6,540,264 | B1 | 4/2003 | Yokoyama et al. | |
| 7,284,774 | B2 * | 10/2007 | Bauer | F16L 37/0985 285/308 |
| 7,338,093 | B2 * | 3/2008 | Bilstein | F16L 37/1225 285/307 |
| 7,370,889 | B2 * | 5/2008 | Maunder | F16L 33/225 285/148.17 |
| 7,984,931 | B2 * | 7/2011 | Kertesz | F16L 37/0847 138/109 |
| 2004/0041394 | A1 | 3/2004 | Dahms et al. | |
| 2004/0232696 | A1 * | 11/2004 | Andre | F16L 37/0985 285/319 |
| 2005/0186070 | A1 | 8/2005 | Zeng et al. | |

FOREIGN PATENT DOCUMENTS

| | | |
|---|---|---|
| JP | 2000310381 A | 11/2000 |
| WO | 2004020892 A1 | 3/2004 |
| WO | 2006/018384 A1 | 2/2006 |

OTHER PUBLICATIONS

International Preliminary Report on Patentability for PCT/EP2013/067691 (dated Apr. 21, 2015).

* cited by examiner

PLUG-IN CONNECTION SYSTEM, IN PARTICULAR FOR FLUIDIC LINES, FITTINGS OR ASSEMBLIES

BACKGROUND

The present invention relates to a plug-in connection system, in particular for fluid lines, fittings, or assemblies, comprising a first coupling part, such as a housing part, and a second coupling part, such as a plug part, which can be plugged into a receiving opening of the first coupling part along an axis, wherein a holding element for latching with a counter holding element of the other coupling part is arranged on one of the two coupling parts, wherein the holding element has a spreading surface which, by sliding relative to a counter spreading surface of the counter holding element, causes a spreading movement of the holding element transversely to the axis by a spreading path under the action of a an installation force when being plugged in by an installation path.

An embodiment of a plug-in connection of this general type is known from WO 2006/018384 A1. This document describes a plug-in connection for fluid lines, consisting of two coupling parts, which can be plugged together, namely in particular a sleeve part and a plug part, wherein the sleeve part can be plugged in a sealing manner into a receiving opening of the plug part with a plug shaft, and which can be detachably locked by means of a locking device when it is plugged in, the locking device consisting, on the one hand, of two external, radial, flange-like, and in plugged state axial, in plug-in direction adjacent holding bars of the two coupling parts, on the other hand, at least one holding part, which axially and radially positively encompasses the holding bars of both coupling parts with at least one axially C-shaped holding section. The holding element is configured on the holding part for latching with the counter-holding element, which also has the spreading surface, while the counter-holding element with the counter-spreading surface is formed by the holding bar of the sleeve part. The spreading surface and the counter-spreading surface each have a conical configuration, so that they substantially fully slide onto one another when plugged in.

WO 2006/018384 A1 describes a technical solution that makes it possible, maintaining the advantages of the known locking principles, to reduce the risk of losing the holding element and to simplify installation, even in application cases in which only a small surrounding space is available at the installation site. The known coupling device has proven itself in practice under the name VOSS plug-in system 246 for many different applications. In particular, in an embodiment of the plug-in system designated VOSS 246 AX, which preferably can be used for connecting fuel lines and assemblies, it allows quick connect. The system is mounted by plugging the plug part, onto which the holding part has already been premounted, into the housing or sleeve part, the holding element of the plug part latching with the counter-holding element of the housing part. It has been shown that undesired high plug-in force maxima occasionally occur with this type of installation during the plug-in process.

SUMMARY

The underlying object of the present invention is to improve a plug-in connection system of the type mentioned above with regard to its installation behavior, wherein in particular a system should be provided, by means of which a maximum installation force to be applied during the plug-in process can be reduced, and/or the plug-in forces over the path covered by the second coupling part during assembly can be kept constant, while maintaining the advantages of the known system.

According to the present invention, this object is attained in that the contour of the spreading surface, which contour faces the counter spreading surface, is adapted to the counter contour of the counter spreading surface in such a way that the spreading path changes nonlinearly depending on the installation path, or, inversely, the counter contour is accordingly adapted to the contour during the plug-in process.

The invention is based on the evaluation of numerous analyses of the changes in installation force during the plug-in process depending on the path covered by the second coupling part when being plugged in. By means of these analyses, characteristic trajectory curves of the dependency of the plug-in force on the installation path could be obtained, which are advantageously modified by the invention in terms of reducing high plug-in force maxima. This is realized on the basis of the known, exclusively conical shapes of the spreading surface and the counter spreading surface sliding relative thereto.

By means of a mutually adapted geometrical configuration of the spreading surface and/or of the counter spreading surface, by means of which, during the plug-in process, the spreading path nonlinearly changes, in particular, at least in part over-proportionally, proportionally and/or sub-proportionally changes in different installation phases depending on the installation path, the work to be applied for installation can be more uniformly distributed over the entire plug-in process than with the known plug-in connection system, which in an installation force-installation path diagram is reflected as an almost rectangular area below the trajectory curves of the plug-in forces. In particular, in an optimized installation force-installation path characteristic curve according to the present invention, the height of the installation force peaks during the plug-in process can be reduced. In this case, it is also advantageously possible to shorten the entire installation path, which, in particular, results in an advantage in terms of minimizing the required installation space.

As a result of the fact that, in particular in at least one of the different installation phases, preferably at least in the main installation phase, the contour of the spreading surface can be adapted to the counter contour in such a way that the contour of the spreading surface and the counter contour do not completely contact one another, but only linearly, but at least in an extremely narrow strip relative to the total surface, so that the friction forces occurring during the plug-in process can advantageously be reduced to a minimum.

Furthermore, the complex causality which must be considered when exerting the installation forces can be taken into account through the invention. So in a fluid conveying plug-in connection system, in which the second coupling part is a plug part, which can be plugged in a sealing manner into the receiving opening of the first coupling part along the axis with a shaft, and in which in one of the two coupling parts at least one groove is circumferentially configured for sealing, in which one circumferential seal, in particular made of an elastomer, is arranged, which defines the installation force, by among other ways through the interaction of the circumferential seal with the two coupling parts starting at a certain point in time during installation and continuing thereafter. This or plugging against a so-called outflow stop, thus for example against the spring force of a valve arranged downstream in the fluid flow, normally results in an overproportional increase in plug-in force in the known plug-in connection system. In the scope of inventive adjustment of the contour of the spreading surface to the counter contour of the counter spreading surface facing it, through the corresponding, antagonistic, non-linear changes of the spreading path depending on the installation path, such influences of additional forces acting counter to plug-in force can be advantageously compensated for.

To this end, the contour of the spreading surface and/or the counter contour can also consist of several sections, which are each configured differently. In this case, it is possible to combine by sections or over the entire surface, conical, concave, and/or convex contours with one another: e.g. preferably conical in the spreading surface vs. convex in the counter spreading surface, or, conversely, convex in the spreading surface vs. conical in the counter spreading surface, convex in the spreading surface vs. concave in the counter spreading surface, or conversely, or a conical section together with a convex section in the spreading surface vs. a conical section in the counter spreading surface, et cetera. The transitions between the sections can in particular be configured to be continuous, so that no sudden changes in the actuating forces are induced.

BRIEF DESCRIPTION OF THE DRAWINGS

Further advantageous features of the embodiments of the invention are contained in the subclaims as well as in the description below. The invention will be explained in more detail below with reference to several preferred exemplary embodiments which show:

FIG. 6 is a greatly enlarged longitudinal section of the spreading surface and of the counter spreading surface in a non-inventive plug-in connection system designated VII in FIG. 3a;

DETAILED DESCRIPTION

As regards the following description, it is explicitly stated that the invention is not restricted to the exemplary embodiments nor to all or a number of features of the described combinations of features; rather, any individual partial feature of any exemplary embodiment may also be considered to be essential to the invention, independently of all other partial features described in connection therewith, alone and also in combination with any features of another exemplary embodiment.

Figure 6:
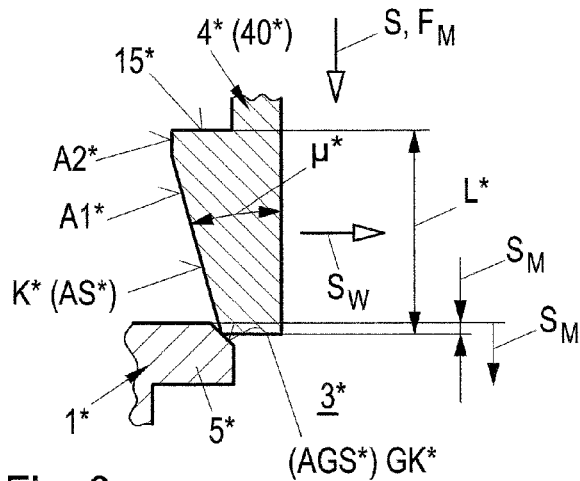

In the different figures of the drawing, the same and corresponding parts are always designated with the same reference signs and will therefore normally be only described once below. The reference signs of the structural parts of the non-inventive embodiment in FIG. 6 are additionally designated with an asterisk (*).

Figure 1:
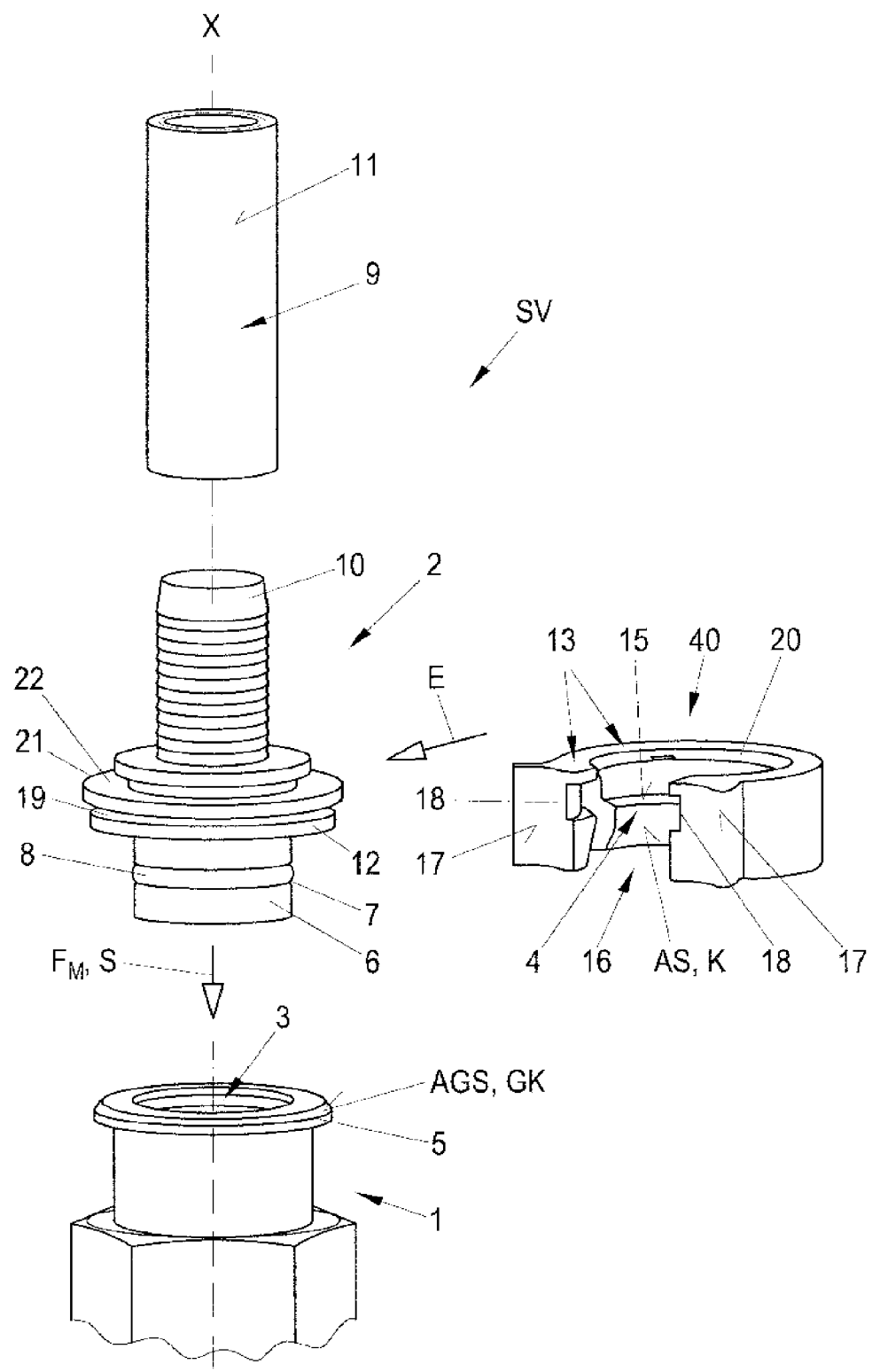
FIG. 1 is a perspective exploded view of the main components of a preferred exemplary embodiment of a plug-in connection system incorporating the principles of the present invention.
Figure 2:
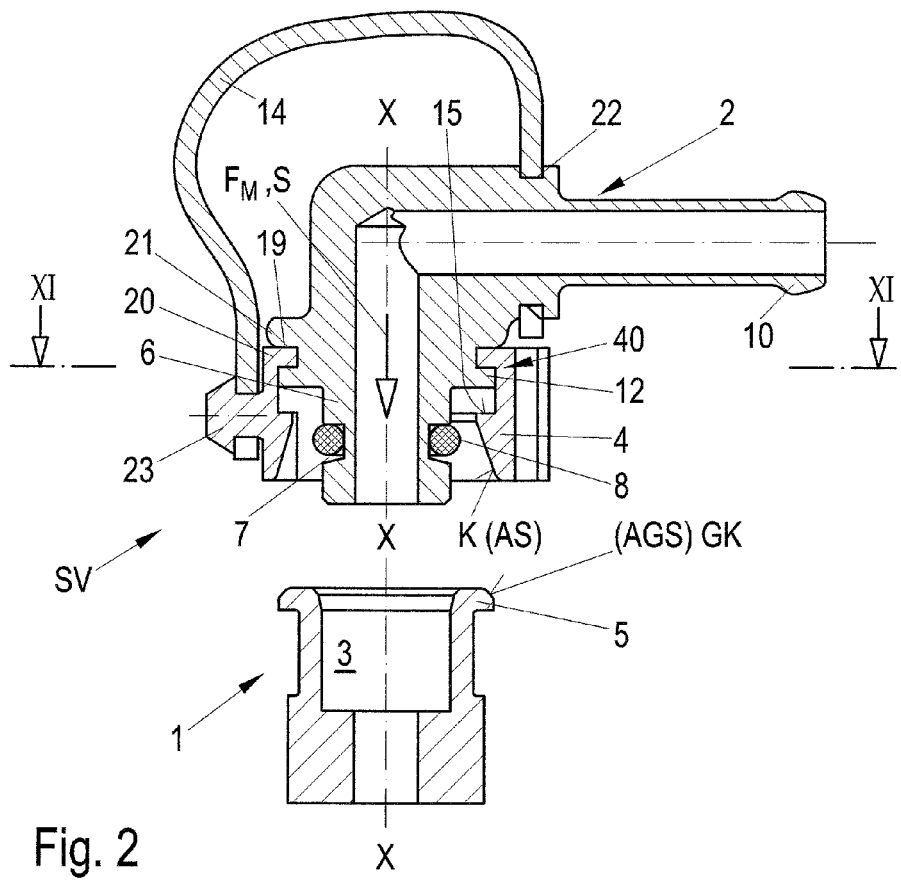
FIG. 2 is an axial sectional view of another preferred exemplary embodiment of a plug-in connection system incorporating the principles of the present invention and illustrating the system in the pre-installed state.
Figure 3A:
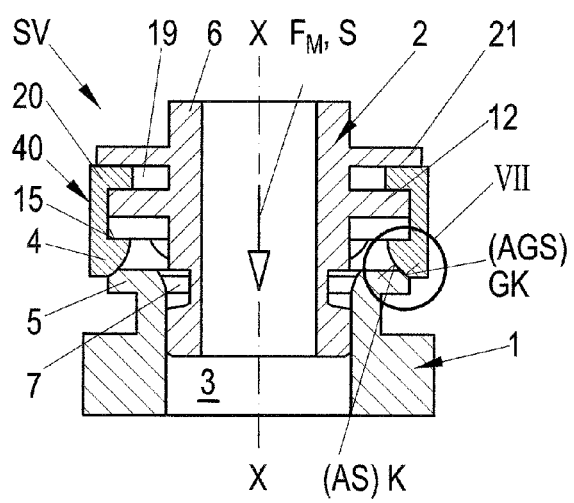
FIGS. 3a and 3b are an axial section of a third preferred exemplary embodiment of a plug-in connection system incorporating the principles of the present invention during installation, as seen in FIG. 3a, and in the ready installed state as seen in FIG. 3b.
Figure 3B:
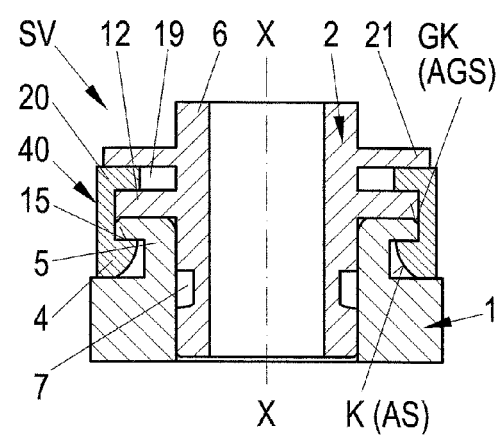

As is apparent from FIGS. 1 and 2, but also from FIGS. 3a and 3b, an inventive plug-in connection system SV, which can in particular be used for fluid conveying lines, fittings, and assemblies, comprises a first coupling part 1, such as a housing part or adapter part for a fluid assembly, and a second coupling part 2, such as a plug part, which can be plugged into a receiving opening 3 of the first coupling part 1 along an axis X-X. The plug-in direction of the second coupling part 2 into the first coupling part 1 is designated in the figures by an arrow with the reference sign S.

In the embodiment in FIG. 1, the plug-in connection system SV according to the present invention has a straight configuration, and an angled configuration in FIG. 2, and in FIGS. 3a and 3b, the plug-in connection system SV according to the present invention likewise has a straight configuration, wherein the systems in FIG. 1 and FIGS. 3a and 3b differ in the way a line is or can be connected. FIGS. 3a and 3b show sections of an inventive plug-in connection system SV without the line connections, which can have a desired specification depending on the particular application.

A holding element 4 is arranged on one of the two coupling parts 2 for latching with a counter-holding element 5 of the other coupling part 1, wherein the counter-holding element 5 is in particular formed by a flange-like holding bar of the first coupling part 1 configured as a sleeve part. The holding element 4 may be configured in one piece with the respective coupling part 2; or in the case of a special embodiment—as shown—it preferably is a holding element 4 on a separate holding part 40.

The holding element 4 has a length L and a spreading surface AS, which, by sliding on the other coupling element 1 relative to a counter spreading surface AGS of the counter-holding element 5, causes a spreading motion of the holding element 4 transversely to the axis X-X by a spreading path $s_W$ under the effect of an installation force $F_M$ acting in the plug-in direction S when the coupling part 2 is plugged in by an installation path $s_M$ along the axis X-X. The spreading surface AS is a circumferential internal oblique surface on the margin of the holding element 4 facing the coupling part 1. The counter spreading surface AGS is a circumferential external oblique surface on a margin of the counter-holding element 5 facing the second coupling part 2.

According to the present invention, it is provided that the contour of the spreading surface AS facing the counter spreading surface AGS is adapted to the counter contour GK of the counter spreading surface AGS in such a way that the spreading path $s_W$ changes nonlinearly depending on the installation path $s_M$. The cross-sections of FIG. 2, 3a, 3b as well as 6 to 10 only show the contour K or the counter contour GK of the surfaces AS and AGS. In contrast to FIG. 1, the corresponding reference signs of the surfaces AS and AGS are therefore each shown with each in parenthesis.

The second coupling part 2 in particular is a plug part which can be plugged in a sealing manner into the receiving opening 3 of the first coupling part 1 along the axis X-X with a plug shaft 6, wherein at least one groove 7 is circumferentially configured in one of the two coupling parts 1, 2 for sealing in the embodiments shown in FIGS. 1, 2, 3a, and 3b, in which one circumferential seal 8, in particular made of an elastomer, is arranged (FIG. 1, 2) or can be arranged (FIG. 3a, 3b).

FIG. 1 also shows a connection end of a fluid line 9, which can be connected to a fitting or an assembly by means of the plug-in connection system SV according to the present invention. The fluid line 9 can be flared for installation, as shown for the first and second embodiment in FIGS. 1 and 2 by way of example on the plug part 2, i.e. pushed onto a spike 10 of the plug in a force- and form-fitting manner, where it can have in particular a flexible wall 11 for that purpose. In the third embodiment of the plug-in connection system SV according to the present invention, there could instead be a weld to a rigid line 9.

When plugged in, the plug part 2 of the inventive plug-in connection system SV can be entirely detachably locked to the sleeve part 1 by means of a locking device, which is not described in more detail. The locking device consists, on the one side, of two external, radial, flange-like holding bars 5, 12 of the two coupling parts 1, 2 used for providing the plug-in connection, of which one holding bar is the counter-holding element 5, and the other holding bar 12 is located on the plug shaft 6, and on the other side of the holding part 40, which has the holding element 4, and can be premounted on the second coupling part 2. As is shown for example in FIG. 3b, the holding bars 5, 12 are axially adjacent in the plug-in direction S when plugged in. The holding part 40 axially and radially engages the holding bars 5, 12 with at least one C-shaped holding section 13 in a form-fitting manner.

In this case, the holding part 40 can be captively premounted on one of the two coupling parts 1, 2, namely—as shown in FIG. 2—the plug part 2 in the shown preferred embodiment. A captive fastener 14 can be provided for this purpose. The holding part 40 and the captive fastener 14 can consist of a technical plastic or an elastomer, preferably a thermoplastic elastomer.

The holding part 40 and the first coupling part 1 are adapted to one another in such a way that the holding part 40 can be radially latched to the plug part 2, the holding part 40 being radially elastically movable in the region of each holding bar 12. Moreover, in a manner that is characteristic of the invention, the holding part 40, as well as the holding bar 5 of the sleeve part 1 in the region of each holding section 13 are adapted to one another to create a form-fitting latch connection acting in the plug-in direction S in such a way that, when plugging the parts together, each holding section 13 is moved radially outward by the holding bar 5 moving relative thereto—that is, spread by the spreading path $s_W$ and subsequently, when plugged in, encompassing the holding bars 5, 12 of the two parts 1, 2 to be directly connected to one another by a radial return motion inward.

For latching purposes, the holding part 40 has a latching element in the region of each holding section 13 on the side facing the first coupling part 1 in the plugging process, which latching element is formed by the already described holding element 4 configured according to the present invention. A radial internal oblique surface—the spreading surface AS—is configured on the holding element 4 on its front side facing the coupling part 1 in the plug-in direction S, as well as a radial holding margin 15 on its opposite side. By means of its oblique surface—the counter spreading surface AGS—the holding bar 5, which produces a relative movement during the plug-in process, generates a radial outward spreading movement of the holding element 4 until it finally springs back and engages behind the holding bar in a latching manner, that is, the counter-holding element 5—with the radial posterior margin 15 in a form-fitting manner.

Figure 11:
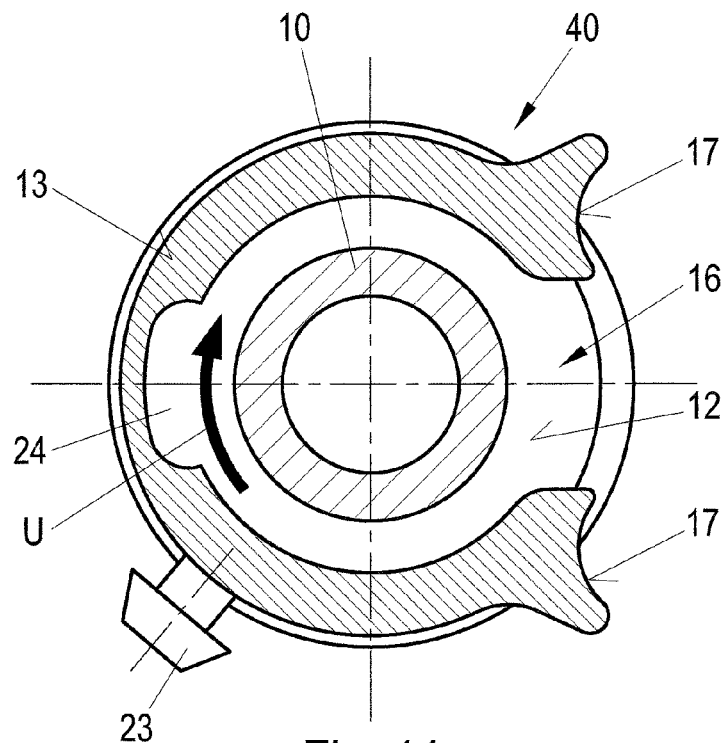
FIGS. 11 and 12 are cross-sectional views of two preferred embodiments of a holding part of a plug-in connection system according to the present invention taken along line XI-XI in FIG. 2.
Figure 12:
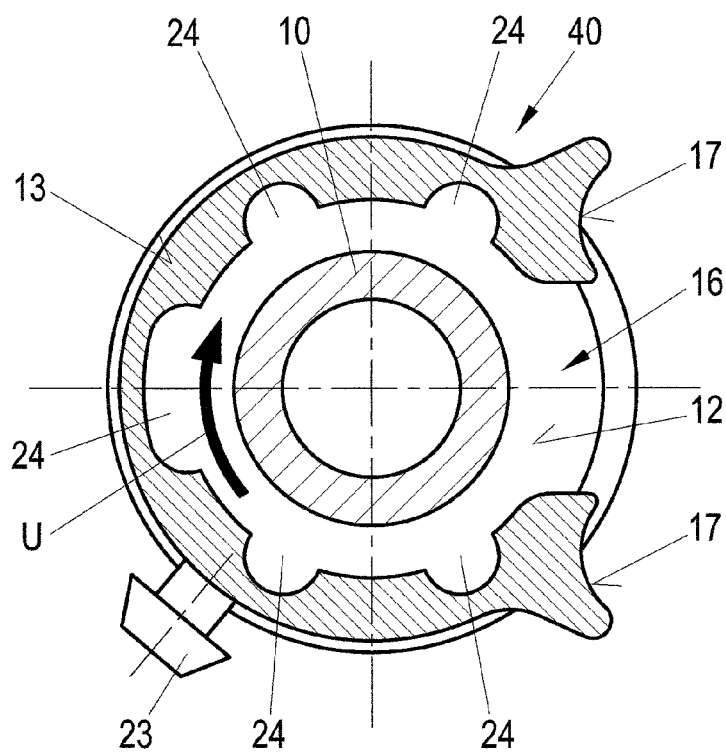

The holding element 40 can preferably be configured as a one-piece elastic ring clamp, which has an axially and radially continuous slot-type interruption 16 at a peripheral point to be radially deformable in an elastic manner, as is shown in FIGS. 1, 11 and 12. In this connection, window-like through openings 18 can be formed for the holding bars 5, 12 in the region of the clamp ends 17 opposite one another in the circumferential direction and separated by the slot-type interruption 16 of the ring clamp. This facilitates the pre-installation and de-installation of the holding part 40.

In order to preinstall and fasten the holding part 40 to the plug-in part 2, as shown in FIGS. 2 and 3a, the plug-in part 2 has a radial annular groove 19 for receiving a corresponding radial annular collar 20 of the holding section 13 of the holding part 40. The annular collar 20 can be inserted into the annular groove 19 (arrow E) by means of a transverse radial movement in the direction of the plug-in direction S of the ring clamp with the slot-type interruption 16 forward by means of elastic expansion of the ring clamp, the groove 19 preferably being formed axially between the holding bar 12 and an additional fastening bar 21, whose diameter is larger than the diameter of the holding bar 12.

For de-installation, the holding part 40 can be removed by raising the latch with the sleeve part 1 laterally counter to the direction of the arrow E, and the plug part 2 extracted from the sleeve part 1. The captive fastener 14 ensures that the holding part 40 will not be lost. As shown, the captive fastener 14 is in particular configured as a retention strip made of a rubber elastic material, which, on the one hand, is seated in a circumferential retention groove 22 on the plug part 1, and which, on the other hand, is clipped to a mushroom-shaped spike 23 protruding outward from the circumference of the holding part 40, as can be seen in FIG. 2.

Figure 4:
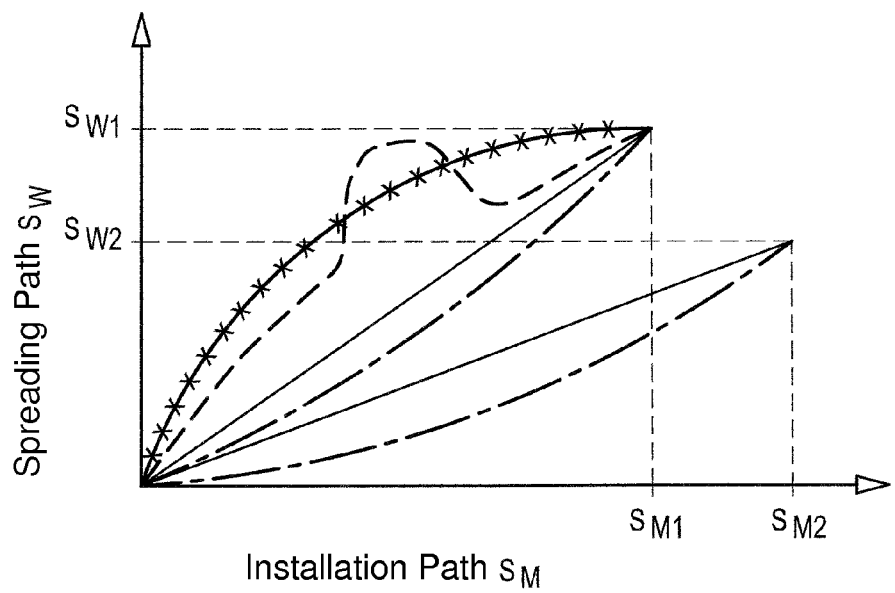
FIG. 4 is an in principle diagrammatic representation of the dependency of the spreading path on the installation path for three inventive plug-in connection systems in comparison with two non-inventive plug-in connection systems.

FIG. 4 compares the dependency of the spreading path $s_W$ on the installation path $s_M$ for four inventive plug-in connection systems SV (idealized curve lines identified by the dashed, dot-dashed, x-x-x line) and for two non-inventive plug-in connection systems (identified by a simple continuous line). The x-x-x line identifies an over-proportional dependency, the dot-dashed line sub-proportional dependencies, and the dashed line represents a nonlinear dependency, which can be described by a continuously differentiable constant higher-order polynomial, a so-called spline function. Two installation path lengths $s_{M1}$, $s_{M2}$ are shown. The trajectory curve for the longer, second installation path length $s_{M2}$ represents a non-inventive and an inventive technical approach; the trajectory curves for the shorter, first installation path length $s_{M1}$ show one non-inventive and three inventive technical approaches. In all cases, a longer spreading path $s_{W1}$ corresponds to the shorter first installation path $s_{M1}$, and a shorter second spreading path $s_{W2}$ corresponds to the longer second installation path $s_{M2}$.

Figure 5:
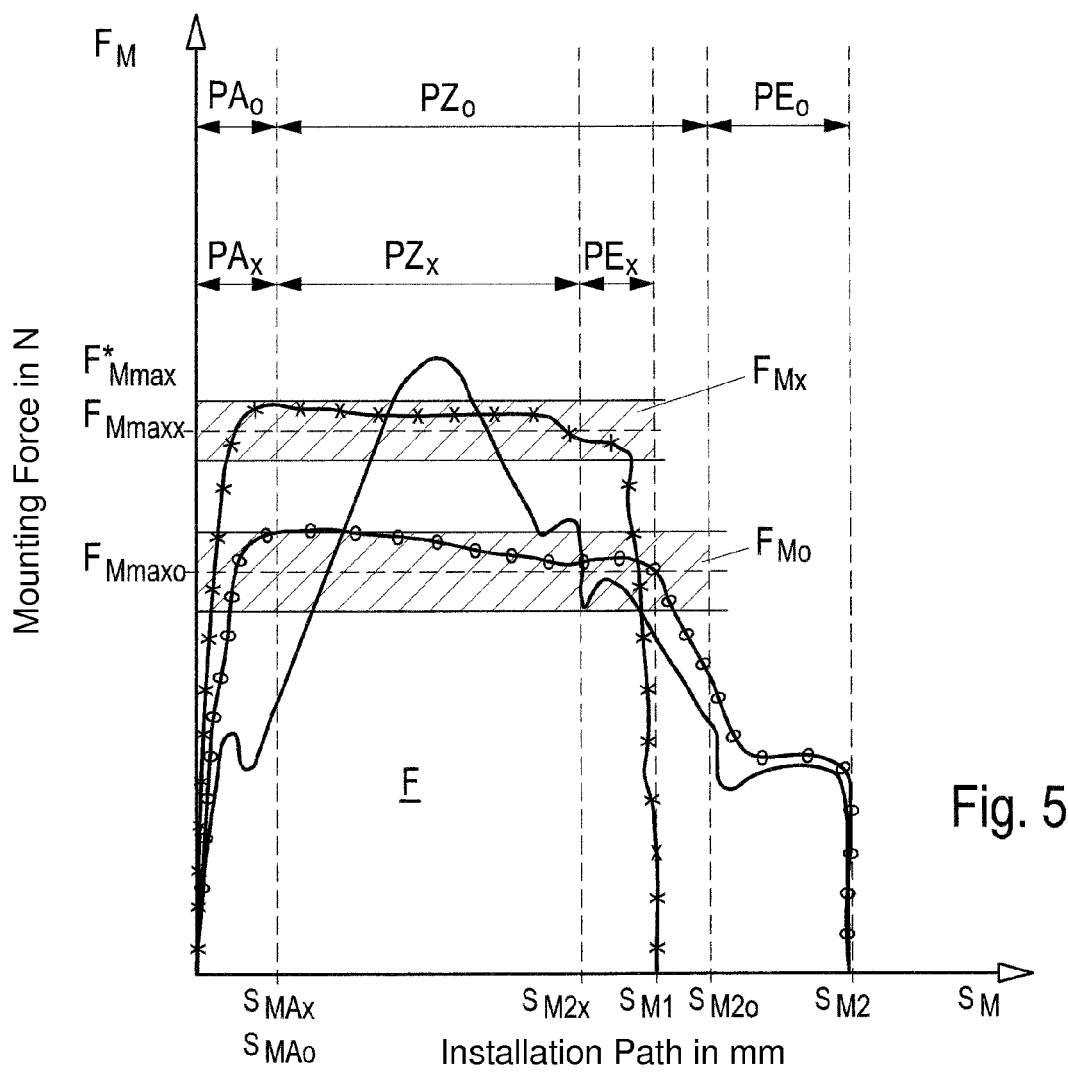
FIG. 5 is a comparative diagrammatic representation of the dependency of the installation force on the installation path for two inventive plug-in connection systems and one non-inventive plug-in connection system.

FIG. 5 compares the dependency of the installation force $F_M$ on the installation path $s_M$ for two inventive plug-in connection systems SV (identified by the idealized curve lines o-o-o and x-x-x) and for one non-inventive plug-in connection system (identified by an idealized simple continuous line representing the averaged values).

The characteristic curve of the latter was obtained from multiple measurements, the connection system having a holding element 4 and a counter-holding element 5, each with a contour K of the spreading surface AS and a counter contour GK of the counter spreading surface AGS, as shown in FIG. 6. The complete installation path of this system is designated with the reference sign $s_{M2}$, as in FIG. 4.

Figure 8:
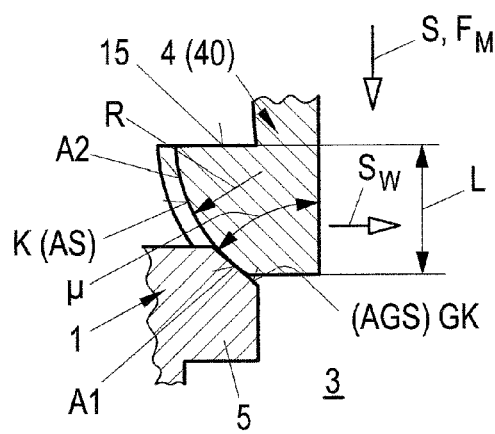

The characteristic curve of the plug-in connection system SV according to the present invention represented by the curve line x-x-x was obtained with a holding element 4 and a counter element 5, with, respectively, a contour K of the spreading surface AS and a counter contour GK of the counter spreading surface AGS, as shown in FIG. 8. The curve line x-x-x shows an example of a shortened plug-in part $s_{M1}$, as well as a reduced maximum plug-in force $F_{Mmaxx}$ compared with the maximum plug-in force $F^*_{Mmax}$ of the non-inventive embodiment, wherein, according to the present invention, it is also possible to minimize only one of the two magnitudes, installation path $s_M$ or maximum plug-in force $F_{Mmax}$. The characteristic curve of the plug-in connection system SV according to the present invention represented by the curve line o-o-o was obtained with an embodiment, which is not shown, that was different from the embodiment of FIG. 8 in that the holding element 5 had the same length L as the non-inventive embodiment of FIG. 6. Accordingly, the installation path $s_{M2}$ is also longer.

Compared with the inventive embodiment, the characteristic curve force-installation path $F_M$-$s_M$ is represented in the non-inventive embodiment by a lower, first approximation linear increase of the installation force $F_M$ by the installation path $s_M$. In the plug-in process, it then reaches a maximum of $F^*_{Mmax}$ (for example approximately 5 mm in FIG. 5) and then drops to 0 in two steps, which characterizes the latching. Further plug-in is not possible due to the contact with one another of the holding bars 5, 12 of both coupling parts 1, 2, which is exemplified by a sudden, extremely increased plug-in force at the end of the curve.

The configuration of the characteristic curves force-path $F_M$-$s_M$ is comparatively different. In this case, there are three installation phases in the plug-in process: an initial installation phase $PA_O$, $PA_X$ each with same plug-in path $s_{MAo}$, $s_{MAx}$, a main installation phase $PZ_O$, $PZ_X$ with plug-in paths of different sizes $s_{MZo}$, $s_{MZx}$, and a final installation phase $PE_O$, $PE_X$ with plug-in paths $s_{M2}$, $s_{M1}$ of different sizes. During the plug-in process in the main installation phase $PZ_O$, $PZ_X$, the installation path $s_M$ covered by the second coupling part 2 is several times larger than the installation path $s_M$ covered in the initial installation phase $PA_O$, $PA_X$, and the installation path $s_M$ covered by the second coupling part 2 in the final installation phase $PE_O$, $PE_X$. Such differentiation in plug-in phases is not possible in the non-inventive embodiment.

It can be seen in the drawing that, within the scope of both embodiments of the invention, the contour K of the spreading surface AS is adapted to the counter contour GK in such a way that, at the beginning of the plug-in process, with a modification $\Delta s_M$ of the installation path $s_M$, a strong modification $\Delta s_M$ of the spreading path $s_W$ occurs in the respective initial installation phase $PA_O$, $PA_X$. Compared to the non-inventive embodiment, a considerably steeper, i.e. a several times higher increase in the installation force $F_M$ along the installation path $s_M$ results. In particular, a maximum plug-in force $F_{Mmax}$ is already achieved in the initial installation phase that is not exceeded as the plug-in process continues.

Figure 7:
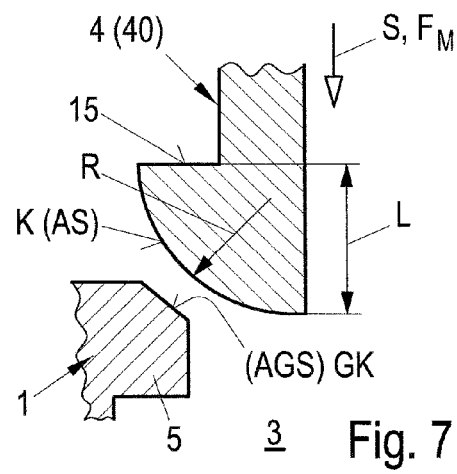
FIGS. 7 to 10, illustrate the spreading surface and the counter spreading surface in different embodiments of a plug-in connection system according to the present invention.
Figure 9:
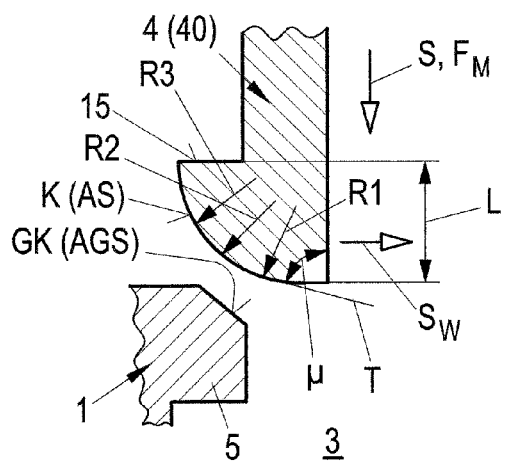

Such a steep increase can be achieved on the one hand if the contour K of the spreading surface AS and/or the counter contour GK at least sectionally is configured in the shape of a flattened dome, in particular as a ball, an ellipsoid, or a rotation paraboloid, having a cross-sectional convex boundary of its outside surface, as shown in the example of FIGS. 7 and 9. The increase is nonlinear in this case because a modification $\Delta s_M$ of the installation path $s_M$ causes an over-proportional modification $\Delta s_W$ of the spreading path $s_W$. The geometry of the respective limiting curve of the cross-section of the contour can in this case—also sectionally—be approximated by radii, straight lines, and/or differentiable function curves of higher order polynomials, which are termed splines in mathematics, in particular so-called B-splines.

But on the other hand, a steep increase in the initial installation phase $PA_O$, $PA_X$ can also be achieved if the contour K of the spreading surface AS and/or the counter contour GK in the section A1 has a conical configuration at the tip of the holding element 4 with a cross-sectional straight boundary of its outside surface, as shown in the example of FIG. 8. Then the increase is linear. Phased linear modifications of the installation force $F_M$ and of the spreading path $s_W$ depending on the installation path $s_M$ are thus not excluded according to the present invention, as long as the spreading path $s_M$ does not linearly change—at least when viewed over its full length—depending on the installation path $s_M$.

For the inventive increase to be larger than in a non-inventive embodiment, the angle μ enclosed by the contour K or a tangent T to the contour K (FIG. 9) with the axis X-X in a curved conical or convex section at the tip of the holding element 4 should be greater than 45° but less than 90°. The larger the angle μ, the steeper the increase. In comparison thereto, in the non-inventive embodiment according to FIG. 6, the corresponding angle μ* enclosed by the contour K* with the axis X-X, is in a range between 0° and a maximum of 35°.

Owing to the steep increase, the main installation phase $PZ_O$, $PZ_X$ is already achieved after the second coupling part 2 has only covered less than 15 percent, preferably less than 10 percent, especially preferably less than 5 percent of the total installation path $s_M$.

With regard to the main installation phase $PZ_O$, $PZ_X$, FIG. 5 shows through the shaded band-shaped regions that according to the present invention the contour of the spreading surface AS is preferably adapted to the counter contour GK in such a way that in the main installation phase $PZ_O$, $PZ_X$, the installation force $F_M$ does not deviate by more than 20 percent, preferably no more than 15 percent, especially preferably no more than 10 percent from an average value of the installation force $F_M$ in the main installation phase $PZ_O$, $PZ_X$. This is applicable to both exemplary embodiments, wherein the variability of the installation force $F_M$ of the embodiment with the holding element 4 of longer length L (o-o-o) is larger than the embodiment with the holding element 4 of shorter length L (x-x-x), wherein the required maximum plug-in force $F_M$ is considerably lower than in the former case, however.

It should be said for both inventive embodiments—even for the embodiment with the holding element 4 of shorter length L (x-x-x)—that the required maximum plug-in force $F_{Mmaxo}$, $F_{Mmaxx}$ is at least 10 percent lower, and in the directly comparable embodiment with the holding element 4 of longer length L (o-o-o) more than 25 percent lower than the maximum installation force $F^*_{Mmax}$ of the non-inventive embodiment. Typical values that, according to the present invention, are achieved as a decrease in the maximum installation force $F_{max}$ referred to the comparable non-inventive embodiments are in the range of 35 to 40 percent in plug-in connection systems SV without circumferential seals 8, or other forces additionally acting against the plug-in process, and in the range of 10 to 25 percent in plug-in connection systems SV with additional counteracting forces during the plug-in process, as those caused, for example, by the presence of circumferential seals 8 and/or spring-loaded outflow stops.

It can in particular be provided for the main installation phase $PZ_O$, $PZ_X$ that the contour K of the spreading surface AS be adapted to the counter contour GK in such a way that by modifying the installation path $s_M$, the spreading path $s_W$ is over-proportionally, proportionally and/or sub-proportionally modified in the main installation phase $PZ_O$, $PZ_X$ between the beginning and end of the plug-in process.

Figure 10:
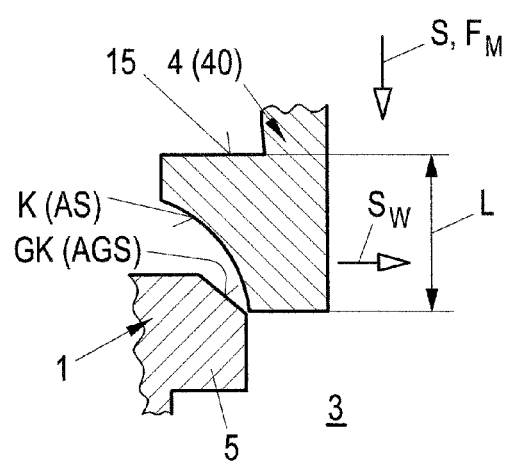

A sub-proportional modification, by means of which, for example, an increase in the plug-in force to be expected from penetration of the circumferential seal 8 in the receiving opening 3 of the first coupling part 1 can be compensated, may be achieved by a concave contour K, as shown in the example of FIG. 10. According to the present invention, it can also be provided that the contour K of the spreading surface AS or the counter contour GK at least sectionally has a cross-sectionally concave boundary of its outside surface, a configuration like a segment of a rotational hyperboloid.

An increase in plug-in force expected from penetration of the circumferential seal 8 in the receiving opening 3 of the first coupling part 1 can additionally be counteracted by a sliding means, e.g. by lubricating the circumferential seal 8 with a suitable lubricating grease. As a result of this, the peak $F_{Mmax}$ of the plug-in force $F_M$ can additionally be decreased, wherein this decrease is superimposed with those resulting from the curved geometry according to the present invention.

According to the present invention, by means of the geometric configuration of the surface of the holding element 4 and counter-holding element 5, it can preferably be provided that the contour K of the spreading surface AS is adapted to the counter contour GK in such a way that the contour K of the spreading surface AS and the counter contour GK linearly contact one another, in particular in one of the installation phases $PA_O$, $PA_X$, $PZo$, $PZ_X$, $PE_O$, $PE_X$, preferably in the main installation phase $PZ_O$, $PZ_X$. This does result in a high mechanical stress concentration, but the friction coefficient and thus also the required installation force $F_M$ can be reduced by this minimization of the friction surface.

The specific surface F (the integral $F_M$ ($s_M$) $ds_M$) below the dependency curves $F_M$ ($s_M$) in FIG. 5 designates the installation work to be applied during the plug-in process. This work has approximately the same magnitude for all embodiments. However, it can be easily seen that the installation work is distributed more evenly over the entire plug-in process in the embodiments according to the present invention, as a result of which the peak value $F_{Mmax}$ of the plug-in force $F_M$ can be reduced. The surface below the curves of the dependencies $F_M$ ($s_M$), but in particular the surface in the region of the main installation phase $PZ_O$, $PZ_X$ according to the present invention can ideally be described in a first approximation by a rectangle in terms of shape, wherein the above maximum percentage variability about the mean value of the plug-in force $F_M$ in the main installation phase $PZ_O$, $PZ_X$ should be considered as deviations from the rectangular shape.

The different possible embodiments and combinations of the spreading surface AS and counter spreading surface AGS (FIGS. 7 to 10) compared with a non-inventive plug-in connection system (FIG. 6) have already been referred to above. In this respect, it should be added that the installation path $s_M$ is simultaneously shown in FIG. 6 in its specific size in the drawing and once in its direction of movement. The installation path $s_M$ each time starts when the spreading of the holding element 4 begins on application of the contour K onto the counter contour GK and ends when the latch border 15\* or 15 engages the counter-holding element 5\* or 5.

An example of the installation phase occurring between the beginning and end of the process is shown in FIG. 3*a*.

It should also be mentioned with respect to the installation that in the non-inventive embodiment according to FIG. 6, the contour K\* is composed of two sections A1\* and A2\*, of which the first section A1\* facing the counter-holding element 5 has a conical outside surface, and the second section A2\* facing away from the counter-holding element 5 has a cylindrical outside surface. The section A2\* facing away from the counter-holding element 5 thereby does not contribute to an expansion of the cylindrical outside surface.

The embodiments of the spreading surfaces according to the present invention in FIGS. 1, 2, 3*a*, 3*b*, 7, 8, and 9 have a convex contour. In the embodiments in FIGS. 7 and 9, said contour K extends along the full length L of the holding element 4, while two sections A1, A2—a conical tip section A1 and a convex end section A2—are provided in the embodiment according to FIG. 8. The embodiments in FIGS. 7 and 9 are different from one another in that the embodiment in FIG. 7 has an outside surface in the shape of a spherical calotte, which is exemplified by the radius R in the drawing, and the embodiment in FIG. 9 has an outside surface in the shape of a rotation paraboloid, which is illustrated by three radii R1, R2, R3 in the drawing.

As already mentioned, FIG. 10 shows an embodiment with a concave contour K of the spreading surface AS, that is, an outside surface of the rotation hyperboloid type.

The invention is not restricted to the shown exemplary embodiments, but also comprises all embodiments of a similar effect consistent with the invention. Thus the contour of the holding element 4 and the counter-holding element 5 can be designed as the kinematic reverse of the shown exemplary embodiments without abandoning the scope of the invention. The embodiment in FIG. 6 can thus become an embodiment according to the present invention with a corresponding design of the counter spreading surface AGS, for example, with an at least sectional convex or concave counter contour GK. The first coupling part 1 should then not be made of metal, as preferred according to the present invention, but of an engineering plastic such as fiberglass-reinforced polyamide.

As already suggested in the embodiment in FIG. 8, the contour K of the spreading surface AS and/or the counter contour GK may be configured of several sections, even more than two sections A1, A2, each section of different design. In this case, the sections effecting an over-proportional, proportional, or sub-proportional modification of the spreading path $s_W$ during the plug-in process can be alternated, wherein even cylindrical outside surfaces are not excluded within the scope of the invention. This results in the so-called spline characteristic, as described with reference to FIG. 4.

Furthermore, for example, as is apparent from FIGS. 11 and 12, which show details of two embodiments of a holding part 40, the annular clamp for influencing its radial elasticity in the region of the holding section 13 and/or in the circumferential regions between the latching elements 4, the ring clamp can have a recess 24 or also several recesses 24. By means of these recesses 24, the amount of the contact surface between the spreading surface AS of the holding element 4 and the counter spreading surface AGS of the counter-holding element 5, and thus the installation force $F_M$ to be applied, is advantageously reduced as well.

Finally, it is possible that with a ring-shaped holding element 4 and/or counter-holding element 5, as shown in the examples, a modification in the shape of the contour K and/or of the counter contour GK in the circumferential direction (arrows U in FIGS. 11 and 12) can be provided. In this way, for example, a convex contour K could modify its curvature in the circumferential direction and/or transition to a conical contour K and vice versa.

Furthermore, the invention is still not restricted to the combination of features defined in claim 1, but can also be defined by any desired combination of specific features of all disclosed individual features. This means that basically any individual feature of claim 1 may be omitted and/or replaced by at least one individual feature disclosed at another point of the application. In this respect, claim 1 is to be understood merely as a first attempt at formulating an invention.

The invention claimed is:

1. A plug-in connection system for fluid lines, fittings, or assemblies, comprising a first coupling part, a second coupling part, and a holding element, the second coupling part being plugged into a receiving opening of the first coupling part along a central axis defined by the first coupling part, the holding element engaging one of the first and second coupling parts and being configured to latch with a counter-holding element formed on the other of the first and second coupling parts, wherein the holding element has a spreading surface which, by sliding relative to a counter spreading surface of the counter-holding element, causes a spreading movement of the holding element transversely with respect to the central axis along a spreading path during plugging in of the second coupling part with the first coupling part along an installation path, the spreading surface having a spreading contour facing the counter spreading surface and adapted to a counter contour of the counter spreading surface, the counter contour and the spreading contour engaging one another during insertion of the second coupling part into the first coupling part during an installation phase, such that the spreading path of the holding element changes in a non-linear manner depending on its position along the installation path, wherein in the installation phase includes a main installation phase between an initial installation phase and final installation phase, the main installation phase having a length traversed by the second coupling part along the installation path that is greater than another length traversed by the second coupling part along the installation path during at least one of the initial and final installation phases, and wherein the spreading contour of the spreading surface is configured to create an installation force increasing up to a maximum installation force in the initial installation phase that is generally maintained in the main installation phase and greater than an installation force in the final installation phase.

2. The plug-in connection system according to claim 1, wherein the spreading contour of the spreading surface is adapted to the counter contour in such a way that in an initial installation phase along the installation path, the spreading path is over-proportionally modified relative to a linear installation path.

3. The plug-in connection system according to claim 1, wherein the spreading contour of the spreading surface engages the counter contour in such a way that in a final installation phase along the installation path of the spreading path is sub-proportionally modified relative to a linear installation path.

4. The plug-in connection system according to claim 1, wherein the spreading contour of the spreading surface engages the counter contour in such a way that in a main installation phase between an initial and final installation phase along the installation path, one of an over-proportional, proportional, or sub-proportional modification of the spreading path occurs relative to a linear installation path.

5. The plug-in connection system according to claim 1, wherein the spreading contour of the spreading surface engages the counter contour in such a way that in a main installation phase between an initial and final installation phase along the installation path, an installation force ($F_M$) deviates from an average value of the installation force in the main installation phase by no more than 20 percent.

6. The plug-in connection system according to claim 1, wherein at least one of the spreading contour of the spreading surface and the counter contour at least partially has a cylindrical or conical configuration cross-sectional straight boundary of its outside surface.

7. The plug-in connection system according to claim 1, wherein at least one of the spreading contour of the spreading surface and the counter contour is at least partially configured in the shape of one of a calotte, a ball, an ellipsoid, and a rotation paraboloid in a cross-sectional convex boundary of its outside surface.

8. The plug-in connection system according to claim 1, wherein one of the spreading contour of the spreading surface and the counter contour at least partially has a cross-sectional concave boundary of its outside surface in a configuration in the shape of a segment of a rotation hyperboloid.

9. The plug-in connection system according to claim 1, wherein at least one of the spreading contour of the spreading surface and the counter contour includes several sections each of which has a different configuration.

10. The plug-in connection system according to claim 1, wherein the spreading contour of the spreading surface engages the counter contour in such a way that the spreading contour and the counter contour linearly contact one another in one of an initial installation phase, a final installation phase and a main installation phase between the initial and final installation phases.

11. The plug-in connection system according to claim 1, wherein the second coupling part is a plug part that can be plugged in a sealing manner into the receiving opening of the first coupling part along the axis (X-X) with a shaft, wherein at least one groove is circumferentially configured in one of the first and second coupling parts for sealing, a circumferential seal of an elastomer material being arranged in the groove.

12. The plug-in connection system according to claim 11, wherein the circumferential seal is provided with a sliding material.

13. The plug-in connection system according to claim 1, further comprising a locking device including two external, radial holding bars, on the first and second coupling parts, the holding bars being axially adjacent in a plug-in direction when the first and second coupling parts are fully engaged, the locking device further including at least one holding section part provided with the holding element and engaging the holding bars.

14. The plug-in connection system according to claim 13, wherein the holding part axially and radially engages the holding bars of the first and second coupling parts in a form-fitting manner with at least one holding section having a C-shaped axial sectional view, wherein the holding part is radially latched to the second coupling part, the holding part being radially elastically movable in a region of the holding section.

15. The plug-in connection system according to claim 13, wherein at least one of the holding part provided with holding elements and the counter holding element is ring-shaped, at least one recess being provided in the circumferential direction in a region of one of the holding element and the counter holding element.

16. The plug-in connection system according to claim 1, wherein at least one of the holding element and the counter holding element is ring-shaped and a variation in at least the shape of one of the spreading contour and the counter contour is provided in a circumferential direction.

17. The plug-in connection system according to claim 1, wherein the spreading contour engages the counter contour in such a way that in a main installation phase between an initial and final installation phase along the installation path, an installation force ($F_M$) deviates from an average value of the installation force in the main installation phase by no more than 15 percent.

18. The plug-in connection system according to claim 1, wherein the spreading contour of the spreading surface engages the counter contour in such a way that in a main installation phase between an initial and final installation phase along the installation path, an installation force ($F_M$) deviates from an average value of the installation force in the main installation phase by no more than 10 percent.

19. A plug-in connection system for fluid lines, fittings, or assemblies, comprising a first coupling part, a second coupling part, and a holding element, the second coupling part being plugged into a receiving opening of the first coupling part along a central axis defined by the first coupling part, the holding element engaging one of the first and second coupling parts and being configured to latch with a counter-holding element formed on the other of the first and second coupling parts, wherein the holding element has a spreading surface which, by sliding relative to a counter spreading surface of the counter-holding element, causes a spreading movement of the holding element transversely with respect to the central axis along a spreading path during plugging in of the second coupling part with the first coupling part along an installation path, the spreading surface having a spreading contour facing the counter spreading surface and adapted to a counter contour of the counter spreading surface, the counter contour and the spreading contour engaging one another during insertion of the second coupling part into the first coupling part during an installation phase, such that the spreading path of the holding element changes in a curvilinear manner depending on its position along the installation path, wherein in the installation phase includes a main installation phase between an initial installation phase and final installation phase, the main installation phase having a length traversed by the second coupling part along the installation path that is greater than another length traversed by the second coupling part along the installation path during at least one of the initial and final installation phases, and wherein the spreading contour of the spreading surface is configured to create an installation force increasing up to a maximum installation force in the initial installation phase that is generally maintained in the main installation phase and greater than an installation force in the final installation phase.

* * * * *